US006754004B2

(12) United States Patent
Granberg

(10) Patent No.: US 6,754,004 B2
(45) Date of Patent: Jun. 22, 2004

(54) OPTICAL SIGHT

(75) Inventor: Erik Granberg, Bromma (SE)

(73) Assignee: Alvis Hagglunds AB, Ornskoldsvik (SE)

(*) Notice: Subject to any disclaimer, the term of this patent is extended or adjusted under 35 U.S.C. 154(b) by 0 days.

(21) Appl. No.: 10/316,836

(22) Filed: Dec. 12, 2002

(65) Prior Publication Data

US 2003/0128425 A1 Jul. 10, 2003

(30) Foreign Application Priority Data

Dec. 18, 2001 (SE) .............................................. 0104198

(51) Int. Cl.$^7$ .............................................. G02B 23/08
(52) U.S. Cl. .................... 359/406; 359/402; 359/431
(58) Field of Search .................... 359/399–406, 359/431, 831–837, 857–862, 871–872

(56) References Cited

U.S. PATENT DOCUMENTS

| | | | |
|---|---|---|---|
| 1,530,081 A | * | 3/1925 | Humbrecht et al. ........ 359/405 |
| 3,456,999 A | * | 7/1969 | Hopp .......................... 359/402 |
| 3,790,248 A | * | 2/1974 | Kellow ....................... 359/403 |
| 3,915,561 A | | 10/1975 | Toy ............................. 359/402 |
| 4,573,773 A | | 3/1986 | Arndt et al. ................. 359/402 |
| 4,758,076 A | * | 7/1988 | Loy et al. .................... 313/524 |
| 6,094,302 A | * | 7/2000 | Bergstedt .................... 359/403 |

FOREIGN PATENT DOCUMENTS

| | | |
|---|---|---|
| EP | 0 225 818 A1 | 6/1987 |
| EP | 0 703 481 A1 | 3/1996 |

* cited by examiner

*Primary Examiner*—Thong Q. Nguyen
(74) *Attorney, Agent, or Firm*—Young & Thompson

(57) ABSTRACT

An optical sight for a combat vehicle, intended to be mounted in a weapon turret of the vehicle in order to make possible sight lines at elevations between roughly −10° and 90° of a weapon barrel mounted pivotably about a horizontal axis in the weapon turret. The sight comprises a lower standard sight unit, which deflects vertical incident light by 90° to an eyepiece, and a top mirror, located above the standard sight unit and pivotable in synchronism with elevating movements of the barrel, likewise about a horizontal axis. Positioned above the standard sight unit is a deflection prism which has an upper surface which faces the top mirror, is inclined at roughly 45° to the vertical and is designed to reflect incident light at an angle of roughly 45° to the surface and less, but to transmit light which is incident at roughly 90° to the surface.

3 Claims, 2 Drawing Sheets

OPTICAL SIGHT

BACKGROUND OF THE INVENTION

The present invention relates to an optical sight for a combat vehicle, in particular a sight of the periscope type, intended to be mounted in a weapon turret of the vehicle in order to achieve sight lines at elevations between roughly −10° and 90° of a weapon barrel mounted pivotably about a horizontal axis in the weapon turret, the sight comprising on the one hand a lower standard sight unit, which deflects vertical incident light by 90° to an eyepiece, and on the other hand a top mirror, located above the standard sight unit and pivotable in synchronism with elevating movements of the barrel, likewise about a horizontal axis.

Periscopic sights for combat vehicles normally comprise a lower sight unit angled at 90° and also, arranged pivotably above the latter, a top mirror which is interlinked with the barrel of the weapon so that the sight line follows the elevation of the barrel. This sight configuration functions well at low elevations of the barrel. At higher elevations, up to roughly 60°, very high mirrors are required in order for it to be possible for sufficient light to reach the main lens of the sight. At even higher elevations (up to 90°) of the barrel, sight functioning is practically and theoretically impossible in such a sight arrangement. For this, a new design of the lower sight unit would be necessary, in which the incident ray path is not vertical but is inclined at an angle of, for example, 45°.

SUMMARY OF THE INVENTION

One object of the present invention is to produce a sight which, using an inexpensive, existing lower standard sight unit with 90° deflection, makes possible high elevations of the sight line. To this end, the sight according to the invention described in the introduction is characterized in that it also comprises a deflection prism which is positioned above the standard sight unit and has an upper surface which faces the top mirror, is inclined at roughly 45° to the vertical and is designed to reflect totally incident light at an angle of roughly 45° to the surface and less, but to transmit light which is incident at roughly 90° to the surface, in addition to which the deflection prism has a reflecting surface which lies behind the upper surface in the light incidence direction and is inclined at a smaller angle to the vertical than the upper surface, the mirror being arranged so as to direct incident light parallel to the barrel essentially at right angles to the upper surface of the prism, so that the incident light, after reflection against the surface lying behind, can be reflected from inside against the upper surface in order then to be made to fall vertically into the standard sight unit.

Another object of the invention is also to make possible, in a sight of the new type, a direct view for the vehicle/weapon operator with simple means. This is achieved by virtue of the fact that a secondary prism connected in parallel optically with the standard sight unit is arranged after the deflection prism in the light incidence direction, which secondary prism is designed and arranged so as to receive light incident from the mirror and reflected from outside on the upper surface of the deflection prism and to deflect it towards a person operating the sight in order to make a direct view possible for said person by means of the necessary adjustment of the mirror therefor.

The invention is described in greater detail below with reference to the accompanying drawings.

DESCRIPTION OF PREFERRED EMBODIMENT

Figure 1:
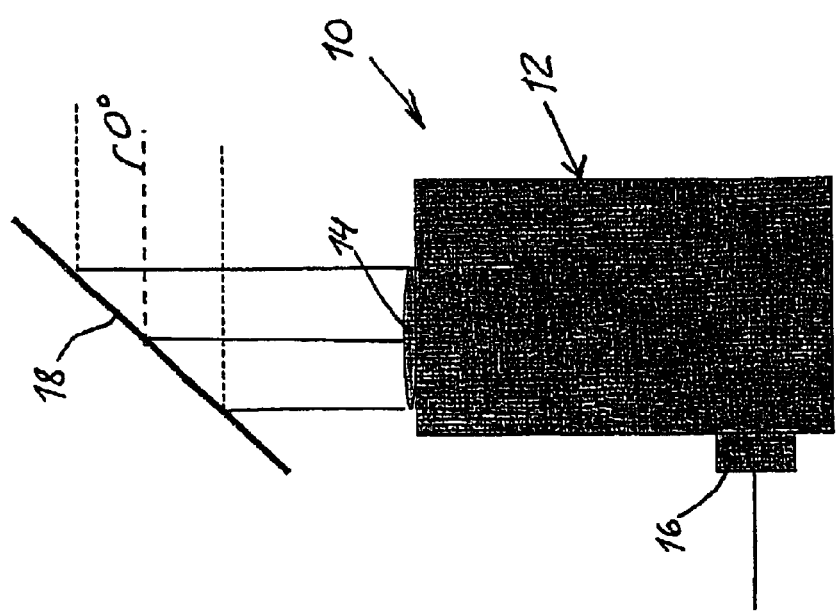
FIG. 1 shows diagrammatically in side view a previously known sight with limited elevation capacity.

FIG. 1 shows a previously known optical sight 10 for a vehicle-mounted weapon, for example a cannon or shell-thrower (not shown). The sight 10 comprises on the one hand a lower sight unit 12 with 90° deflection of the light path from an upper opening 14 to an eyepiece 16, and on the other hand a top mirror 18 lying above, which is rotatable about a horizontal centre axis in synchronism with the barrel of the weapon, that is to say the mirror 18 rotates by an angle corresponding to half the elevation angle of the barrel. The position shown of the mirror 18 corresponds to an elevation of 0° of the barrel. A sight of this type is functionally limited to elevations up to a maximum of roughly 60°.

Figure 2:
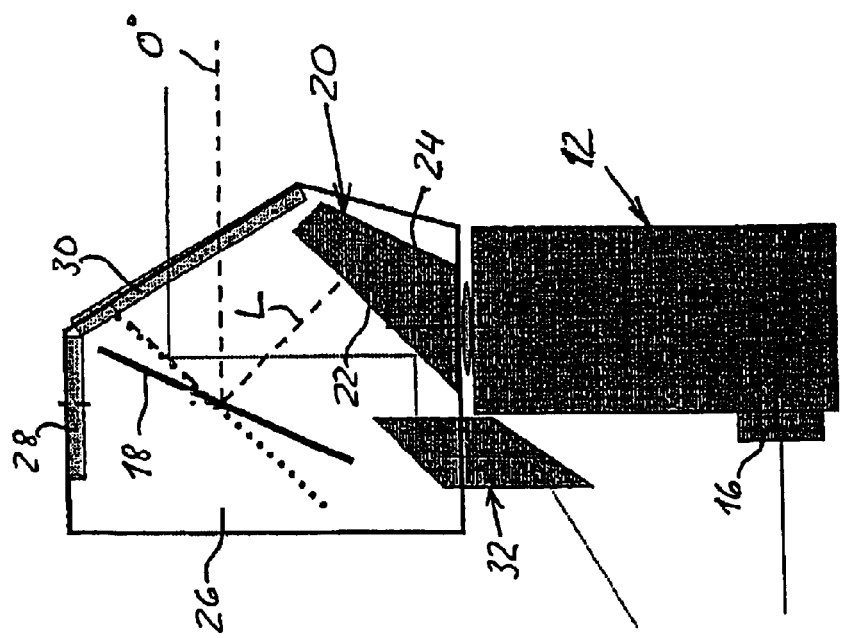
FIG. 2 shows diagrammatically in side view a sight according to the invention with increased elevation capacity and with a possibility for a direct view.

FIG. 2 shows a sight according to the present invention, in which use is made of an existing lower 90° sight unit 12 of the type shown in FIG. 1. In order also to make possible, by means of such a known sight unit 12, sight functioning at high elevations of the barrel, that is to say from roughly 60° up to roughly 90°, it is proposed in accordance with the present invention that a primary deflection prism 20, which has an upper surface 22 facing the top mirror 18 and inclined at roughly 45° to the vertical, is positioned above the unit 12. The surface 22 is of such a nature that it transmits incident light L at an angle of roughly 90°, while it reflects totally light which is incident at an angle of roughly 45° or less to the surface 22, as shown in FIG. 2. To this end, a suitable material with a sufficiently high refractive index has been selected for the deflection prism. The prism 20 has a rear reflecting surface 24 which is inclined at a smaller angle to the vertical than the upper surface 22. In this way, the light L incident from outside is reflected against the surface 24 and then from inside against the surface 22 and is then guided straight down into the sight unit 12 to the eyepiece 16.

The prism 20 and the mirror 18 are positioned in a superstructure part 26 of a weapon turret, while the sight unit 12 is mounted in a lower cabin part of the weapon turret. The superstructure 26 has windows 28, 30, through which the light path can pass at different elevations of the barrel. The position of the mirror 18 in FIG. 2 shown by the solid line corresponds to an elevation of 0° of the barrel.

The sight in FIG. 2 also comprises a secondary deflection prism 32 which makes possible for the operator by utilizing the reflection of the ray path against the upper surface 22 of the prism 20. For a direct view straight ahead, the mirror 18 is adjusted into the position shown by the broken line.

Figure 3:
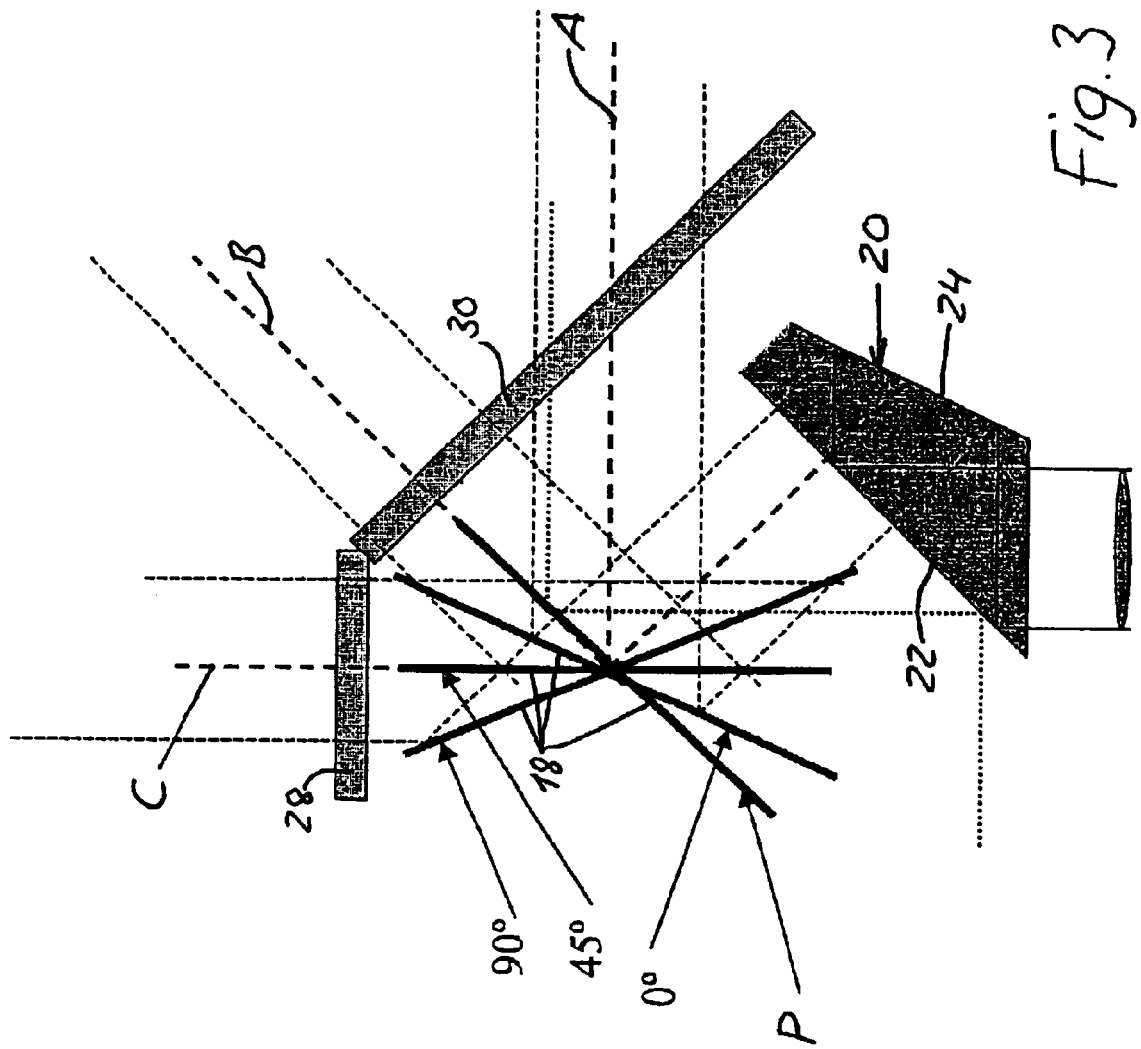
FIG. 3 shows the optical axis (the sight line) of the sight in FIG. 2 in the case of three different positions of the top mirror and also a mirror position and the optical axis in the case of a direct view.

FIG. 3 shows three different angular positions of the top mirror 18 in order to bring about sight lines A, B and C for 0°, 45° and, respectively, 90° elevation of the weapon barrel. A mirror position P for a direct view straight ahead is also shown.

It is clear from the above that by simply adding an angled deflection prism 20 above a 90° sight unit 12 of standard type, it is possible to achieve sight lines at very high elevations, which has not been possible previously with such a standard sight unit. The surface 22 of the deflection prism 20 can moreover be used for a direct view for the operator.

What is claimed is:

1. An optical sight for a combat vehicle, intended to be mounted in a weapon turret of the vehicle in order to make possible sight lines at elevations between roughly −10° and 90° of a weapon barrel mounted pivotably about a horizontal axis in the weapon turret, the sight comprising a lower standard sight unit, which deflects incident light along a vertical line by 90° to an eyepiece, and a top mirror, located above the standard sight unit and pivotable in synchronism with elevating movements of the barrel, and about the horizontal axis, wherein said sight further comprises a deflection prism which is positioned above the standard sight unit and has an upper surface which faces the top mirror, inclined at roughly 45° to the vertical line and designed to reflect totally incident light at an angle of roughly 45° to the surface and less, but to transmit light (L) which is incident at roughly 90° to the surface, in addition to which the deflection prism has a reflecting surface which lies behind the upper surface in the light incidence direction and is inclined at a smaller angle to the vertical line than the upper surface, the mirror being arranged so as to direct incident light (L) parallel to the barrel essentially at right angles to the upper surface of the prism, so that the incident light (L), after reflection against the surface lying behind, can be reflected from inside against the upper surface in order then to be made to fall vertically into the standard sight unit, and wherein a secondary prism connected in parallel optically with the standard sight unit is arranged after the deflection prism in the light incidence direction, which secondary prism is designed and arranged so as to receive light incident from the mirror and reflected from outside on the upper surface of the deflection prism and to deflect it towards a person operating the sight in order to make a direct view possible for said person by means of the necessary adjustment of the mirror therefor.

2. An optical sight for a periscope of a combat vehicle providing sight lines at elevations between about −10° and 90° of a weapon barrel mounted about a horizontal axis in a weapon turret, comprising:

a lower sight unit for deflecting incident light arriving along a vertical line by 90° to an eyepiece;

a top mirror, located above the sight unit and pivotable about the horizontal axis;

a deflection prism positioned above the sight unit and having an upper surface facing the top mirror, the upper surface inclined at roughly 45° to the vertical line, the deflection prism totally reflecting light incident at an angle of up to roughly 45° to the upper surface, and transmitting light incident at 90° to the upper surface, the deflection prism having a reflecting surface which lies behind the upper surface in the light incidence direction and is inclined at a smaller angle to the vertical line than the upper surface, the mirror being arranged so as to direct incident light parallel to the barrel essentially at right angles to the upper surface of the prism, so that the incident light, after reflection against the reflecting surface, is reflected from inside against the upper surface in order then to be made to fall vertically into the sight unit; and a secondary prism connected in parallel optically with the sight unit and arranged after the deflection prism in the light incidence direction, the secondary prism arranged to deflect light, received incident from the mirror and reflected from outside on the upper surface of the deflection prism, towards a person operating the sight in order to make a direct view possible for said person by adjustment of the mirror.

3. An periscope optical sight for a combat vehicle, intended to be mounted in a weapon turret of the combat vehicle in order to provide sight lines at elevations between roughly −10° and 90° of a weapon barrel mounted pivotably about a horizontal axis in the weapon turret, the sight comprising:

a lower sight unit deflecting incident light along a vertical line by 90° to an eyepiece;

a top mirror located above the sight unit and pivotable in synchronism with elevating movements of the barrel about the horizontal axis;

a deflection prism positioned above the sight unit and with an upper surface facing the top mirror and a reflecting surface behind the upper surface, the upper surface inclined at roughly 45° to the vertical line and designed to reflect totally light incident at an angle of roughly up to 45°, and to transmit light incident at roughly 90°, a reflecting surface being behind the upper surface in the light incidence direction and inclined at a smaller angle to the vertical line than the upper surface, the top mirror being arranged so as to direct incident light to the upper surface of the prism, so that the incident light, after reflection against the reflecting surface lying behind, is reflected from inside against the upper surface to be made to fall vertically into the sight unit; and a secondary prism connected in parallel optically with the sight unit and arranged after the deflection prism in the light incidence direction, the secondary prism arranged to deflect light, received incident from the mirror and reflected from outside on the upper surface of the deflection prism, towards a person operating the sight in order to make a direct view possible for said person by adjustment of the mirror.

* * * * *